United States Patent [19]

Campbell et al.

[11] 4,428,115
[45] Jan. 31, 1984

[54] CABLE PRECONNECTORIZATION METHOD

[75] Inventors: Bruce D. Campbell, Portola Valley; James T. Triplett, Livermore, both of Calif.

[73] Assignee: Raychem Corporation, Menlo Park, Calif.

[21] Appl. No.: 258,078

[22] Filed: Apr. 27, 1981

[51] Int. Cl.³ .................. H02G 1/14; H02G 1/08; H01R 4/24
[52] U.S. Cl. .................................. 29/873; 29/866; 29/871; 29/872; 174/74 R; 254/134.3 R; 339/99 R; 339/222
[58] Field of Search ............... 174/70 R, 72 A, 74 R, 174/112; 29/857, 861, 865, 866, 869, 871, 872, 873; 339/148, 222; 361/428; 405/154, 156, 184

[56] References Cited

U.S. PATENT DOCUMENTS 2,010,310  8/1935  Long ........................ 174/70 R X

FOREIGN PATENT DOCUMENTS 3019640  11/1981  Fed. Rep. of Germany .... 174/74 R

*Primary Examiner*—Laramie E. Askin
*Attorney, Agent, or Firm*—James W. Peterson

[57] ABSTRACT

An apparatus and method are described for preconnectorization of the ends of a cable for pulling through a standard diameter duct. The apparatus utilizes a connector consisting of three major parts: first and second wire organizers and a contact element means. The wire organizers are of a form factor sufficiently small and are organized such as to fit around the cable core without increasing the outside composite diameter of the cable. The apparatus further includes two forms of cable pulling devices.

1 Claim, 14 Drawing Figures

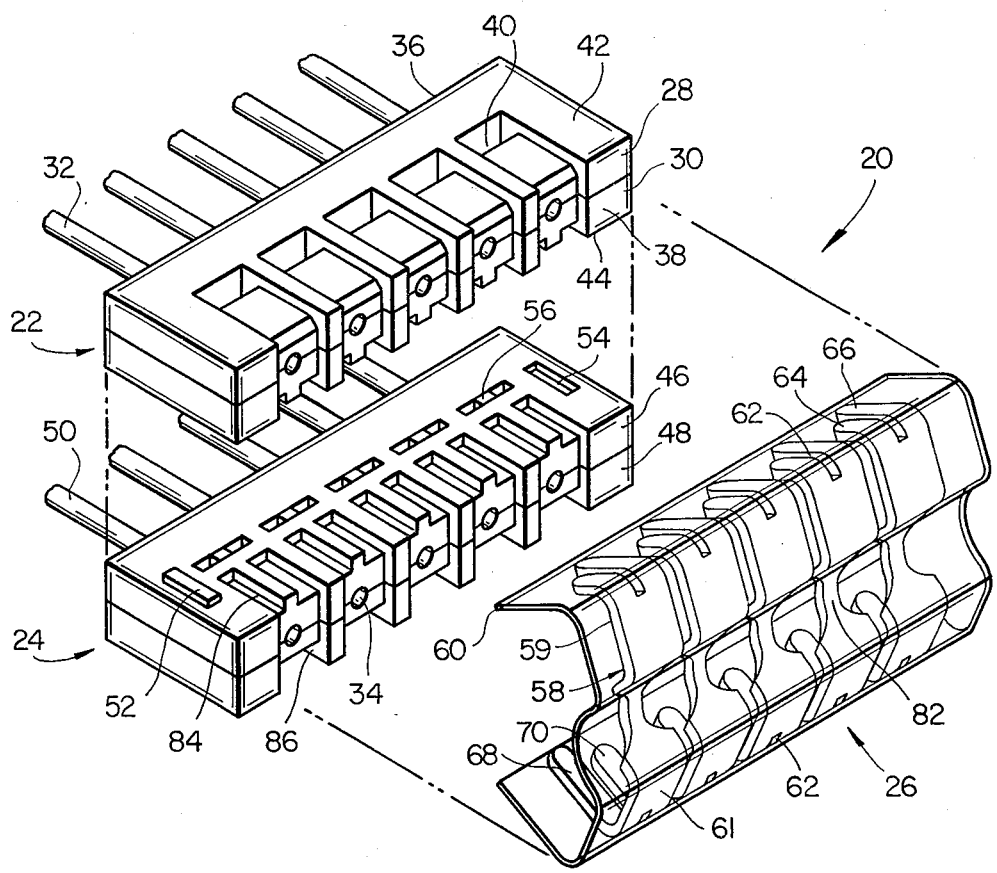
FIG_1
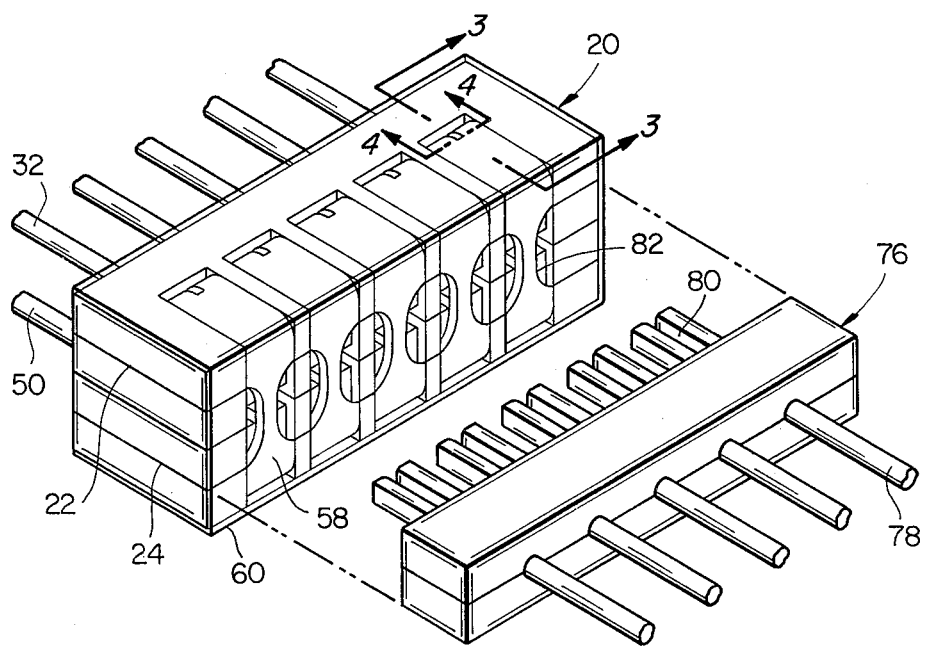
FIG_2

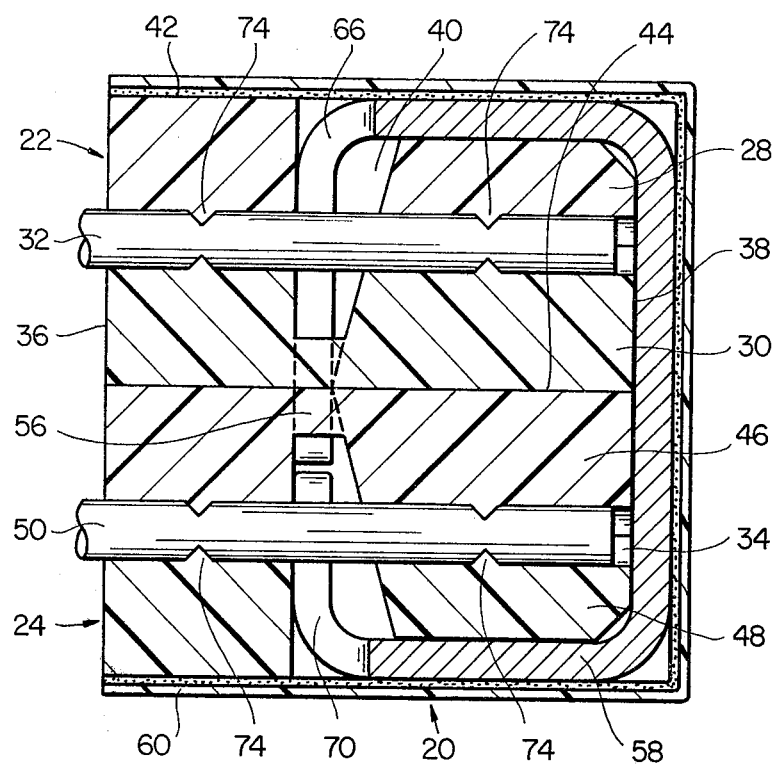
FIG_3
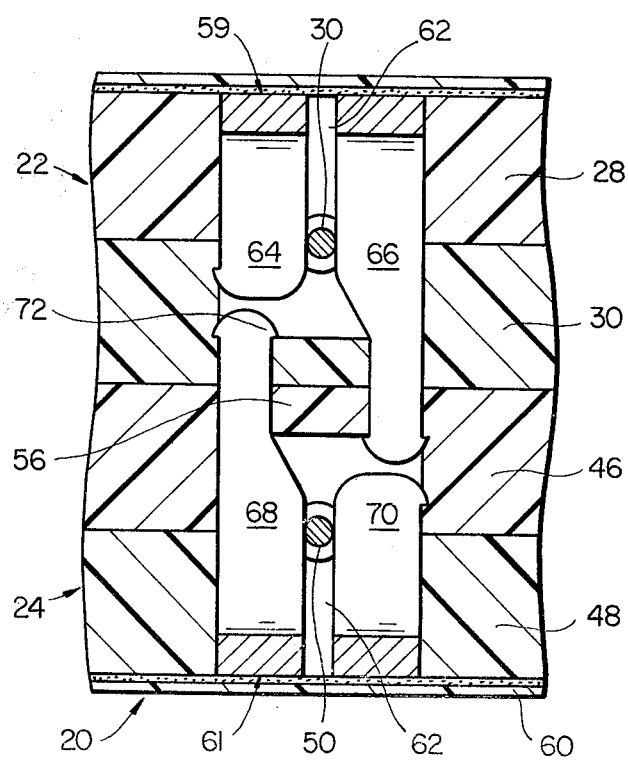
FIG_4

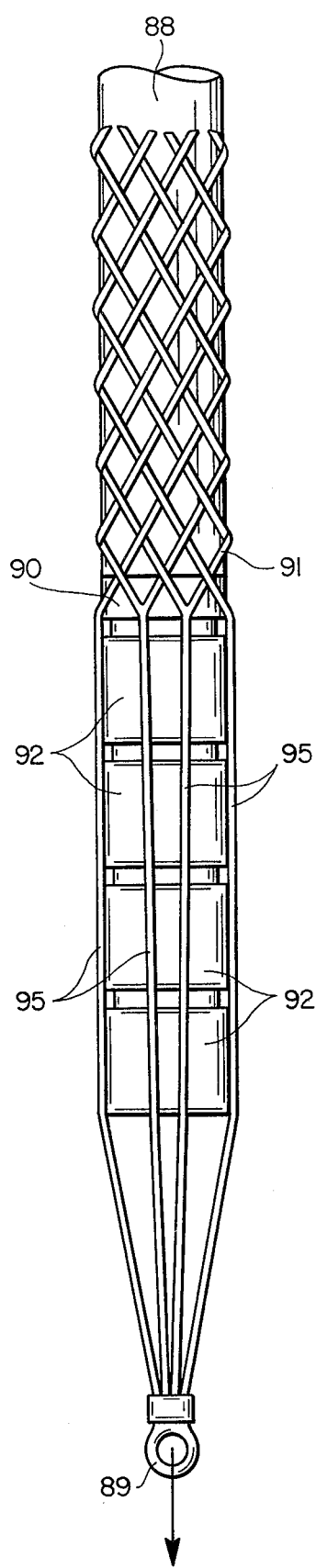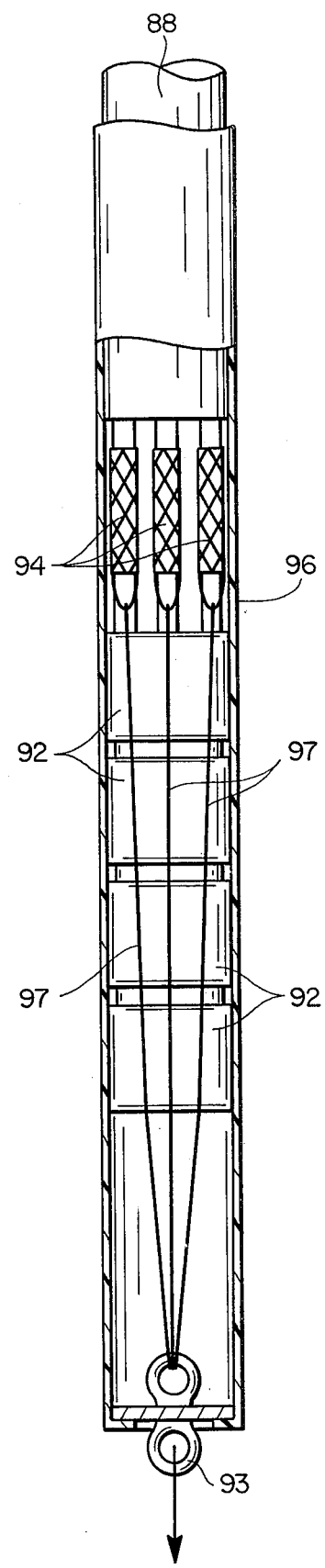
FIG_5  FIG_6

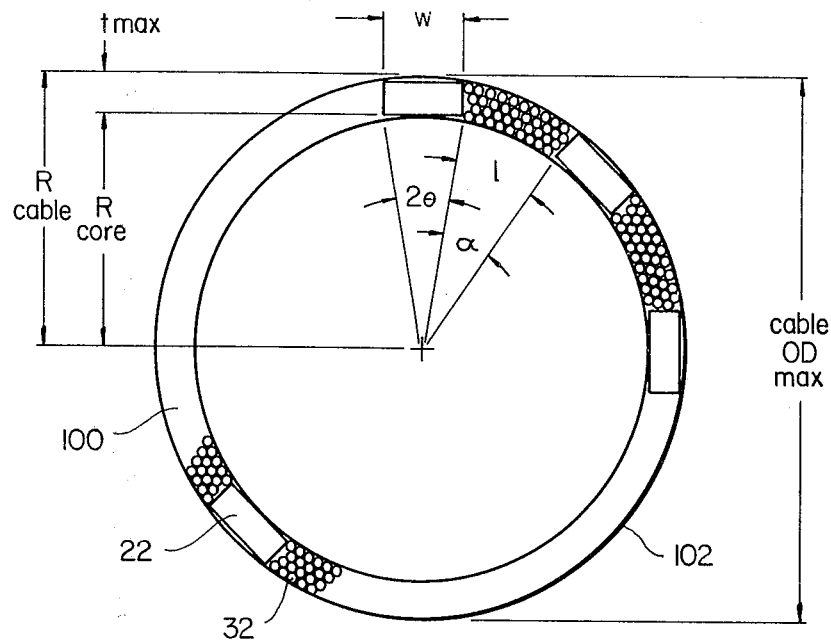
FIG_7
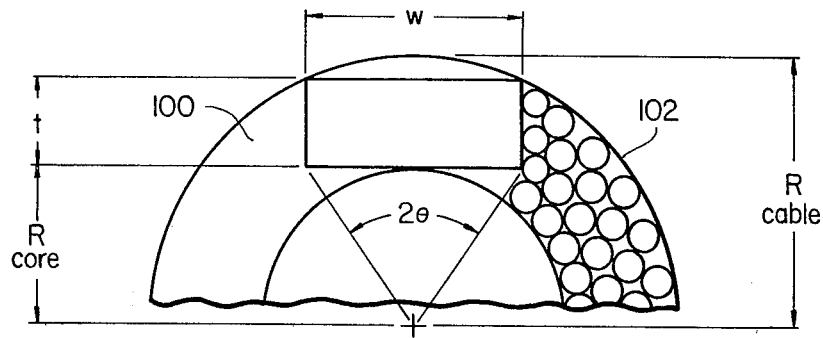
FIG_8
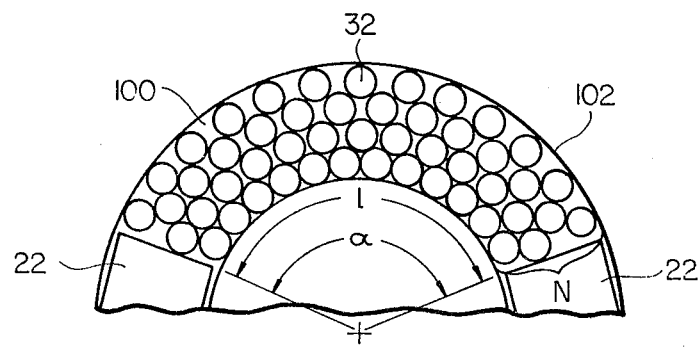
FIG_10

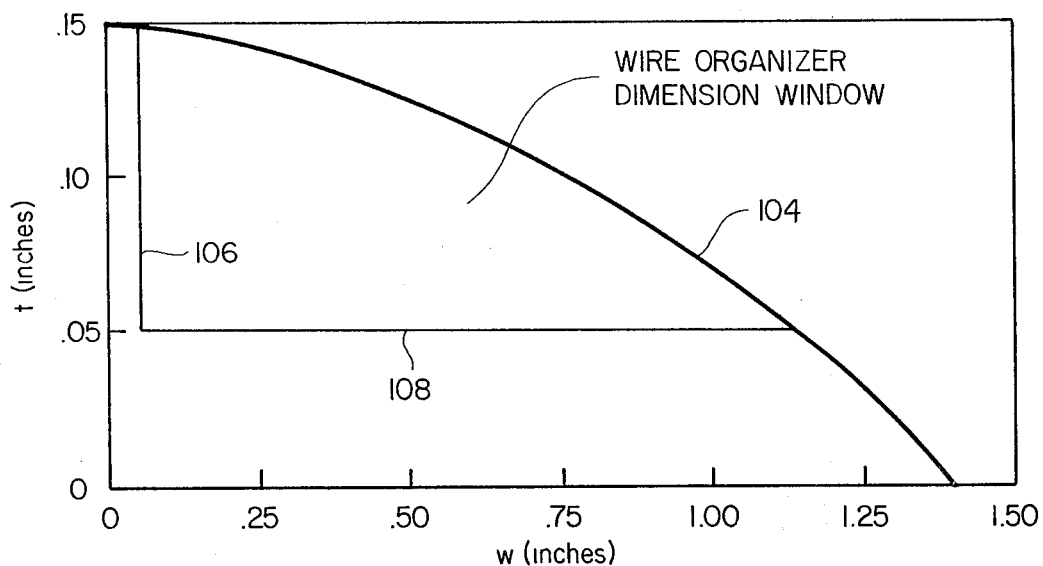
FIG_9
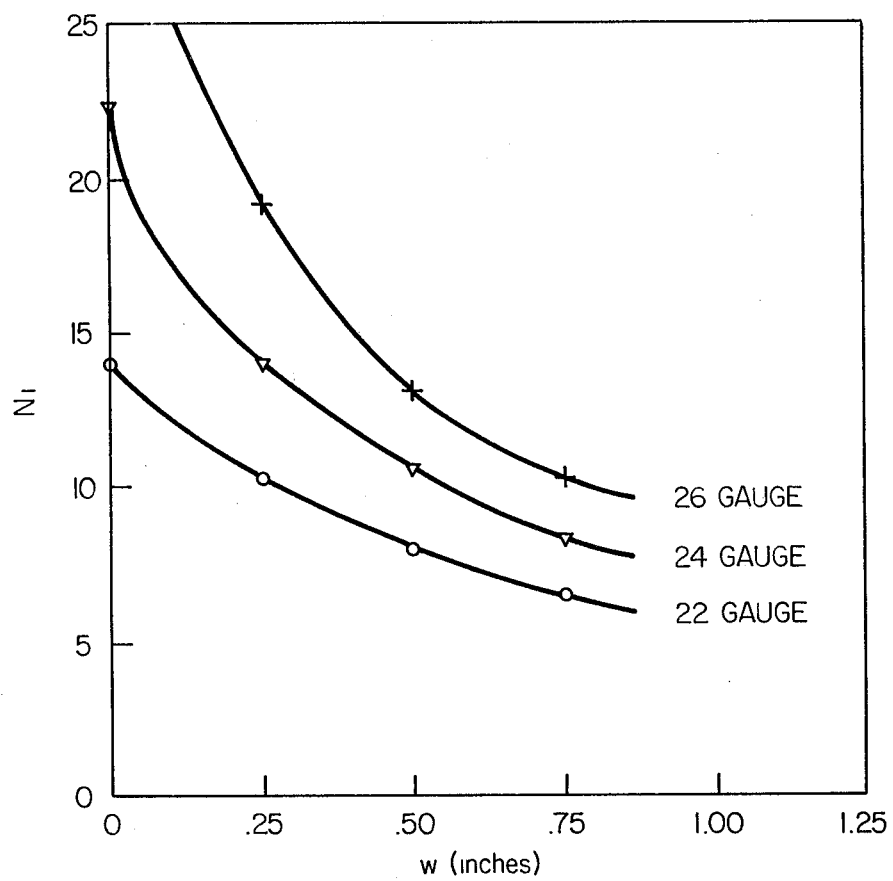
FIG_11

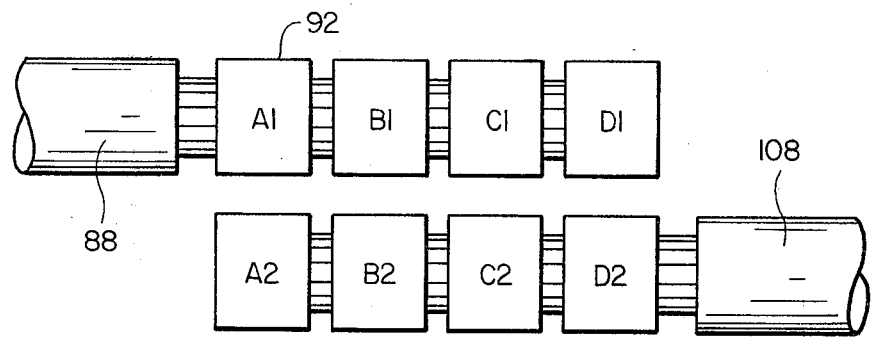
FIG_12
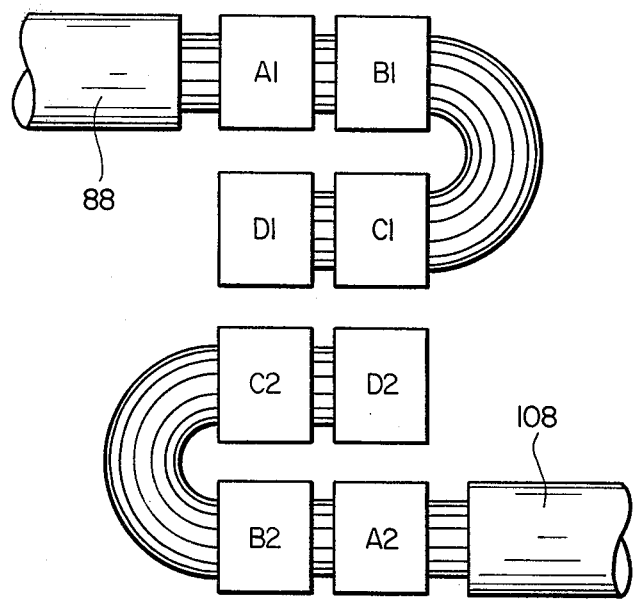
FIG_13
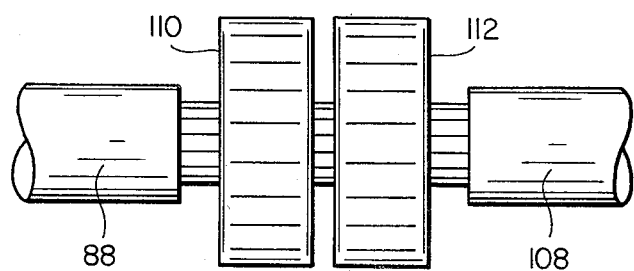
FIG_14

CABLE PRECONNECTORIZATION METHOD

BACKGROUND OF THE INVENTION

Although the idea of applying connectors at the factory or in the field that could simply be plugged into mating connectors on an adjacent length after installation has been considered for some time, it is only recently that it has been considered practical. Wire joining is a very time consuming operation, and when done, for example, in a manhole, under an aerial tent, or in a pit for buried cable, it is performed under adverse conditions. Splicing, accordingly, is relatively slow, and errors are commonly made which must be corrected later, or the wires remain unusable.

Presently available preconnectorization devices are bulky, and therefore limited in utility. Specifically, presently available preconnectorized ends cannot pass through any type of reel opening or small duct as is the standard practice for other cables. When a large pair cable is preconnectorized, the outside diameter of the cable is substantially increased as a result of the connector being added to the dimensional limits of the cable. As a result, preconnectorizing of both ends of the cable is currently practiced in aerial and direct buried plant, but not in the underground where manholes and duct runs are common.

As population grows and greater numbers of communication lines are desired, large pair cable will be increasingly used. Further, when cable is to be pulled through underground ducts and connected at common locations such as manholes, the situation becomes further complicated. When the ducting leading to the manholes was originally built in the past, typically, no thought was given to use of large pair cable or preconnectorization. In the typical case the standard duct has an inside diameter of only four inches. The standard large pair cable (e.g. 3600 pair cable) has an outer diameter of 3.55 inches. As discussed previously, a pulling means is fitted around the cable to pull the cable through the duct. There must be sufficient clearance between the cable with pulling means attached and the inside of the duct in order to pull the cable to a manhole for connection to another preconnectorized cable. In terms of presently available preconnectorization devices, this means that pulling a standard large pair cable through a standard duct is impractical. However, applicants have discovered a method for organizing a preconnectorized cable utilizing applicants' unique connector which does not increase the outer diameter of the cable, thereby allowing it to be pulled through a standard duct.

The applicants have discovered apparatus for preconnectorizing cable core wires in a simple, rapid and effective manner, resulting in a neat and compact assembly, which is easily traced and tested. Stripping of insulation and soldering of wire ends is avoided and a minimum of space is required.

The standard cable comprises a core of wires and a sheath covering and protecting the core. The core is divided in binder groups of wires. As is standard in preconnectorization art, the sheath is stripped back a predetermined distance from the end of the cable. Normally, the sheath is stripped back a little more than twice the expected splice length since matched ends of cables will be joined by folding back before splicing together. The binder groups are divided into banks and are preconnectorized.

As will be appreciated by those skilled in the art, a maximum splice length cannot be exceeded for a given manhole. Hence, not only must a cable be of a maximum outer diameter after preconnectorization, but also the distance wherein the sheath is pulled back, the binder groups divided into banks and the cable reconnectorized, is limited by the splice length possible. Typically, the maximum number of banks possibly assuming standard length is two.

Upon the above recognition the applicants discovered a method for dividing the binder groups into the maximum number of partial banks and selecting the maximum number of binder groups to be in each partial bundle.

Given the maximum number of full banks to be two, applicants divide each cable end into four quarter banks after stripping back the sheath approximately twice the splice length. Each quarter bank containing a preselected number of binder groups is then attached to a uniquely designed wire organizer which does not exceed dimensional limitations discussed more fully below. The binder groups of each quarter-bank are then bundled to the successively diminishing core.

A key element in the success of the method is applicants' connector consisting of three major parts: first and second wire organizers and a contact element means. The wire organizers are of a form factor sufficiently small and are organized such as to fit around the cable core radially and axially without increasing the outside composite diameter of the cable. The wire organizers are attached to corresponding core wires in cables to be connected. The cables may then be pulled through the ducts and then may be later connected electrically by the separate contact element means. The instant invention further includes unique devices connected to the preconnectorized cable for pulling said cable through standard ducts.

OBJECTS OF THE INVENTION

It is a primary object of the instant invention to provide method and apparatus for preconnectorizing the ends of a cable, said cable then being capable of installation through underground ducts.

It is yet another object of the instant invention to provide an organizer of form factor sufficiently small and being organized such as to fit around the cable core without increasing the outside composite diameter of the cable.

It is still another object of the instant invention to provide a connector capable of live bridging.

It is even further an object of the instant invention to provide a connector having readily accessible but environmentally sealed test points which may be used during construction to verify the connectors at the time of placement, and later to convert the cable to other uses.

It is a further object of the instant invention to provide unique apparatus connectable to a preconnectorized cable for pulling said cable to equilibrate the loads on the cable jacket and the core to prevent extension of one with respect to the other.

SUMMARY OF THE INVENTION

It is the purpose of the instant invention to provide method and apparatus for preconnectorizing the ends of a cable for use through small diameter ducts. To accomplish this purpose, the instant invention provides a connector consisting of first and second wire organizers and a contact element means, said organizers being sufficiently small and being organized such as to fit around the cable core without increasing the outside composite diameter of the cable.

The instant invention also provides cable pulling apparatus connected to a preconnectorized cable which will equilibrate the loads on the cable jacket and core to prevent extension of one with respect to the other.

DESCRIPTION OF THE DRAWING

FIG. 1 is an exploded perspective view of the connector of the instant invention prior to connection.

FIG. 2 is a perspective view of the connector of FIG. 1 after connection and further including bridge means prior to its attachment to the connector.

FIG. 3 is a cross-sectional view taken along section lines 3—3 in FIG. 2.

FIG. 4 is a cross-sectional view taken along section lines 4—4 in FIG. 2.

FIG. 5 is a side view of a first embodiment of pulling apparatus for a preconnectorized cable.

FIG. 6 is a side view of a second preferred embodiment of pulling apparatus for a preconnectorized cable.

FIG. 7 is a schematic cross-sectional view illustrating a preconnectorized cable.

FIG. 8 is an enlarged cross-sectional view of a wire organizer in the preconnectorized cable of FIG. 7.

FIG. 9 is a graph of the dimensional limits of width and thickness for a particular wire organizer which does not increase the outside diameter of a cable, based on a 3600 pair cable.

FIG. 10 is an enlarged view of a set of organized core wires in the cable of FIG. 7.

FIG. 11 is a graph of the dimensional limits of core wires for a particular width wire organizer and for a particular gauge wire, based on 50 wires in each organizer.

FIG. 12 is a schematic view of two preconnectorized cables at a common location before connection.

FIG. 13 is a schematic view of the cables of FIG. 12 folded back in preparation for connection.

FIG. 14 illustrates the preconnectorized cables of FIG. 12 connected in two banks.

DESCRIPTION OF THE PREFERRED EMBODIMENT

DESCRIPTION OF THE CONNECTOR

With continued reference to the drawing, FIG. 1 illustrates in exploded perspective view the connector shown generally at 20 comprising a first wire organizer shown generally at 22, a second wire organizer shown generally at 24 and a contact element means shown generally at 26. First wire organizer 22 is comprised of insulating members 28 and 30 which have been pre-applied to organize core wires such as wire 32 as will be discussed further with respect to FIG. 3 of the drawing. Each of said wire organizers has means for securing a plurality of core wires, for example, a plurality of core wire sockets such as wire socket 34 which extends generally through first wire organizer 22 from its front 36 to its back 38. Insulating members 28 and 30 are further provided with a plurality of leg openings such as leg opening 40 which extends from the top 42 to the bottom 44 of first wire organizer 22. It is important to note that the axis of each of said leg openings is generally normal to the axis of a corresponding wire socket and communicates with a corresponding wire socket.

Second wire organizer 24 is preferably identical and/or complementary to first wire organizer 22 and comprises insulating members 46 and 48. Specifically, insulating member 48 may be substantially identical to insulating member 28 and insulating member 46 may be substantially identical to insulating member 30. Second wire organizer 24 is shown as being pre-applied to core wires such as wire 50 of another cable wherein core wires such as wire 50 and core wires such as wire 32 are to be connected by the connector 20. First and second wire organizers 22 and 24 are aligned into a mating relationship by male member 52 and complementary female recess 54. Thus it can be seen that insulating member 46 may be identical to insulating member 30 when reversed top to bottom. Leg openings such as leg opening 40 extend through insulating members 46 and 48 the same as they do with respect to insulating members 28 and 30. It can be seen with respect to insulating member 46 and therefore with respect to insulating member 30 that all leg openings 40 are provided with shoulder means 56 which partially block leg openings 40 as will be discussed further with respect to FIG. 4. Although the first and second wire organizers have been described as being preferably identical and complementary for economy and ease of use, it is understood that variations in configuration are within the scope of the invention which will provide communication between the leg openings and the wire sockets to allow insertion of a contact element means which will secure wire organizers together and will electrically interconnect core wires within the wire sockets.

With continued reference to FIG. 1, contact element means 26 is illustrated as comprising a plurality of crimpable generally C-shaped contacts such as contact 58. Contact 58 is shown in FIG. 1 to be in an open or uncrimped condition and is shown in FIG. 2 to be in an installed or crimped condition. Uncrimped contacts such as contact 58 are held in position relative to each other by a film strip 60 of insulating material which has been coated on one side thereof with sealing material. The sealing material which holds contacts such as contact 58 in place also secures film strip 60 as shown in FIG. 2 to provide an environmental sealing layer. Contacts 58 are made from electrically conductive material such as copper. Contacts 58 have first and second ends shown generally at 59 and 61. Contacts 58 are bifurcated at each end at 62 to provide means to displace wire insulation from wires 32 and 50. Bifurcations 62 at each end of contact 58 define respective pairs of staggered legs 64, 66, and 68, 70. It can be seen in FIG. 4 that the ends of the legs, primarily legs 68 and 66, are provided with barb-like means 72 which make gripping contact with shoulder means 56 of insulating members 30 and 46. The pair of legs 64 and 66 of first end 59 are uneven, leg 66 being substantially longer than leg 64. Similarly, the pair of legs 68 and 70 of second end 61 are uneven, leg 68 being substantially longer than leg 70. The pairs of legs are, therefore, staggered with respect to each other and, when contact 58 is crimped into connected position as shown in FIG. 2, then 66 and 68 are in overlapping relationship. The overlapping relationship of the above-mentioned legs means that wire organizer 22 is secured to wire organizer 24 by a contact 58 having a leg 66 which extends completely through wire organizer 22 and is secured to wire organizer 24. Likewise leg 68 of contact 58 extends completely through the second wire organizer 24 and becomes secured to the first wire organizer 22.

More generally stated, the first and second ends 59 and 61, respectively, provide the ability of the contacts to secure the wire organizers together and to electrically interconnect the core wires. When the contact element means are clamped around the organizers, the first end 59 of each contact extends through the first wire organizer 22 and grips the second wire organizer 24. The second end 61 of each contact extends through the second wire organizer 24 and grips the first wire organizer 22. This relationship of contact ends and wire organizers is hereby defined as the interlocking and overlapping relationship.

It can be seen in FIGS. 3 and 4 that the leg openings such as leg opening 40 are generally normal to and communicate with the axis of the wire sockets 34. It can likewise be seen that the crimping of contact 58 over first and second wire organizers 22 and 24 cause the pairs of legs 64, 66 and 68, 70 to displace the insulation on wire 32 and wire 50. Specifically, bifurcated first and second ends 59 and 61 of contact 58 displace wire insulation to make electrical contact between wire 32 and wire 50. Identical contacts will likewise interconnect respective pairs of core wires organized in first and second wire organizers 22 and 24. It is within the scope of the invention to have the ends 59 and 61 not be bifurcated and have the ends displace insulation from one side.

It can be seen in FIG. 3 that the first and second wire organizers 22 and 24 securely grip wires 32 and 50 in wire sockets 34. This is accomplished by projections 74 on the surface of insulating members 28, 30, 46 and 48. The projections 74 displace insulation on wires 32 and 50 to firmly grip the wires. Insulating members 28 and 30 are secured to each other and insulating members 46 and 48 are secured to each other by an adhesive or equivalent mechanical means. It is further within the scope of the instant invention to utilize wire organizers such as 22 and 24 which are one piece in construction and which have equivalent wire socket securing means for securing a plurality of core wires. Although a five wire organizer has been illustrated, in actual application the organizer accommodates 50 core wires as is the standard in the United States.

Live bridging is the ability to tap into a cable without loss of service. Apparatus of the instant invention provides for live bridging and likewise provides for test points which may be used during construction of cable systems to verify the connectors at the time of placement and later to convert the cables to other uses. FIG. 2 illustrates bridge means 76 which may be utilized to make conductive contact between bridge wires such as bridge wire 78 and wires 32 and 50. Bridge means 76 is provided with conductive tangs such as tang 80 which is connected to bridge wire 78. Conductive tang 80 is complementary with respect to connector 20 as can be seen from FIGS. 1 and 2. Specifically, contacts such as contact 58 have a narrowed body 82 between first and second ends 59 and 61 which is complementary to the opening in conductive tang 80. Likewise the surfaces of insulating members 30 and 46 are provided with tang recesses 84. Body 82 defines a means for live bridging of electrically interconnected core wire.

Tang 80 is capable of penetrating film strip 60 to make mating complementary contact with contact 58 within tang recess 84. It should be noted in FIG. 1 that the first and second wire organizers 22 and 24 and their respective insulating members are provided with a general contact recess 86 which is preferred in order to make a compact connector. Contacts such as contact 58 are embedded within wire organizers 22 and 24 for a flush configuration.

Contact element means 26 and its component contacts such as contact 58 are positioned over the first and second wire organizers and crimped into contact position by use of tools (not shown). It is within the scope of the invention to crimp contacts such as 58 either individually or in gang.

DESCRIPTION OF TOWING DEVICES

FIGS. 5 and 6 illustrate a unique device for pulling a preconnectorized cable through a small duct. FIG. 5 illustrates pulling apparatus for cable 88 which has a plurality of wire organizers such as organizers 22 or 24 as discussed earlier, bundled together into partial banks 92 of organizers as will be discussed later. Towing eyelet 89 is connected by tensioning means 95 to the outside sheath of cable 88 by expandable braid 91. In this device a section of the cable jacket or sheath is removed exposing the core over which is located a clamp 90 which is similar to a rubber band clamping means. Expandable braid 91 grips the sheath of cable 88 when said braid is tensioned, tending to force the cable sheath into further contact with clamp 90. Clamp 90 therefore transfers a portion of the pulling load on the sheath of cable 88 to the core by transferring pulling load to the clamp 90. Clamp 90 prevents extension of the cable sheath with respect to the core to equilibrate the loads on the cable sheath and core and thereby prevent extension of one with respect to the other. It can be appreciated that the above described device is useful with any cable wherein extension of the cable sheath with respect to the core is of concern.

The device illustrated in FIG. 6 comprises an expandable braid means 94 which when tensioned grips the peripheral binder groups of wires within the core of the cable in a space between the partial banks 92 of wire organizers and the end of a stripped-away cable 88. Towing eyelet 93 is connected by tensioning means 97 to the braid means 94 and outside towing plastic cap 96 which is shrunk down into secured contact with the outside surface or sheath of cable 88. The cap 96 defines a clamping means which makes secured contact with the sheath of the cable. The combination of the internally applied expandable braiding means 94 and the cap 96 balance load to equilibrate the loads on the cable sheath and the core to prevent extension of one with respect to the other and any consequential damage to quarter banks of organizers. It can likewise be appreciated that the above described device is useful with any cable wherein extension of the cable sheath with respect to the core is of concern.

DESCRIPTION OF THE METHOD FOR ORGANIZING

The method for organizing the binder groups into partial banks and for selecting the proper number of binder groups for each partial bank is dependent upon the dimensional limits of the wire organizer, the gauge of wire used in the cable and the pair size number of the cable. In determining the dimensional limits of the wire organizer, it was necessary to make certain assumptions. As discussed above, applicants found that the number of partial-banks should be four, hereinafter, quarter-banks. Next applicants assume the most difficult practical use, namely, where the user desires to send a 3600 pair cable through a four inch duct. Further, applicants assume that the 3600 pair cable has an outside diameter of 3.55 inches ($D_{cable}=3.55''$ and $R_{cable}1.775''$) with the jacketing material having a thickness of 0.150 leaving the core a diameter of 3.25" ($D_{core}=3.25$, $R_{core}=1.625$), as is standard in the industry. Further, applicants assume no greater than 50 or 25 pair of core wires in each binder group as is standard in the United States. However, other countries such as Germany have only 20 pair in each binder group which is an easier case as will be appreciated hereinafter.

Finding the Dimensional Limits of the Wire Organizer

The form factor of the wire organizers in each case will be limited most by the size permissible in the first quarter-bank since the only space available to the wire organizer without increasing the outer diameter of the cable is the space vacated by the stripped sheath 102 as shown and indicated by numeral 100 in FIG. 7. Additionally, the wire organizer cannot occupy the entire space, rather there must be sufficient space for the preconnectorized core wires. Thus the inside of the organized cable in cross-section comprises a series of alternating wire organizers and core wires as shown in FIG. 7 and indicated by the numerals 22 and 32, respectively.

Thus, as can be seen in FIG. 7, only wire organizers having a width of W and a thickness of T may be used in the cable without increasing the outside diameter of the cable. The relationship formed by the above is equivalent to the relationship of a chord to a circle, which may be written as:

$$C = 2\sqrt{R^2 - d^2}*$$

*Standard Mathematical Tables, 17th Edition, Chemical Rubber Co. (1969)

Substituting into the general formula for determining the maximum dimensional size of the cable organizer yields the following:

$$W \leq 2\sqrt{R_{cable}^2 - (R_{core} + t)^2}$$

Given the radius of the cable and the radius of the core, the width and thickness are then related. In the particular example where a 3600 pair cable is used, the radius of the cable will typically be 1.775 inches, and the radius of the core will be no more than 1.625 inches. Thus, the width of the organizer W must be as follows:

$$W \leq 2\sqrt{.51 - t^2 - 3.25t}$$

As can be seen in FIG. 9, this relationship is represented by line 104, which is the upper limit for the width and thickness of the wire organizer.

Minimum width of wire organizer

The wire organizer is designed to physically protect the core wires inserted therein as previously discussed. Also as previously discussed, the wire organizer must permit electrical contact with the core wires, grip the core wires, and insulate the core wires from each other by proper spacing.

While the typical 3600 pair wire contains a 26 gauge core wire having approximately a diameter (d) of 0.02 inches, the wire organizer is designed to fit smaller pair cables such as those where the maximum conductor diameter typically expected is 22 gauge or 0.05 inches. Hence, applicant chooses the lower limit of the width of the wire organizer as no less than 0.05 inches.

Preferably, however, the width of the wire organizer is not less than 0.25 inches, to accomplish the above cited objectives within a tolerable range. The minimum width of the wire organizer is represented by line 106 in FIG. 9.

Minimum thickness of the wire organizer

As stated previously, the maximum diameter (d) of a particular conductor expected for use with this type of cable end organizer is 0.05. The minimum thickness of the wire organizers is represented by line 108 in FIG. 9.

Space Occupied by the Preconnectorized Core Wires

As stated previously, the maximum width of the wire organizers is limited by the length L and the number of rows N taken up by the preconnected wires, as shown in FIG. 10.

The objective is for the connected wires to occupy the minimum space possible. In this endeavor, as shown in FIG. 10, the wires are placed in overlapping fashion and squeezed together. There is an optimum number of rows N which allow the minimum length L.

In order to find this minimum length L and optimum number of rows N, one uses the following mathematical relationships:

$$(N-1)d\sin\theta + d \leq R_{Cable} - R_{Core}$$
$$w \qquad\qquad w$$

Given that the wire organizers take up an angle $\theta$ and a width W while the preconnectorized core wires take up a circumferential length L and an angle $\alpha$, the number of wire organizers with connected core wires that can fit around the core $N_1$ is related as follows:

$$N_1 = \frac{360°}{2\theta} + X\alpha$$

As is standard in the industry, a particular pair size cable includes a core wire having a particular gauge or diameter (d). For instance, a 3600 pair cable has a 26 gauge wire while other smaller pair cable typically have larger core wire, namely 24 and 22 gauge. By the following mathematical relationship, the optimum number of rows for 22, 24 and 26 gauge core wire is 3, 4, and 5, respectively (assuming 50 core wires per binder group and consequently per organizer):

$$(N-1)d\sin\theta + d \leq 0.150$$

Working out the second mathematical relationship yields a minimum possible length L for each connected core wire binder group as follows:
26 gauge core wire=0.280
24 gauge core wire=0.455
22 gauge core wire=0.748

Finding the row length yields the following $\alpha$'s for each gauge as follows:
26 gauge core wire=10°
24 gauge core wire=16°
22 gauge core wire=26°

Substituting for α yields the mathematical relationships for each particular core wire size as shown in FIG. 11.

It has been found that the minimum wire organizer width W to accomplish the aforementioned objectives and purposes is approximately 0.25 inches. As can be seen from the graph in FIG. 11, the number of wire organizers in the first quarter-bank for 26 gauge wire is less than 21, for 24 gauge wire the number of wire organizers in the first quarter-bank is less than 16, and for 22 gauge wire, the number of wire organizers in the first quarter-bank is less than 12.

As a practical matter, the user would not want to place the maximum number of wire organizers around the core in the first quarter bank since it becomes increasingly difficult to work with such a larger number of binder groups. In the preferred embodiment, use is made of between 13 and 15 wire organizers in the first quarter bank for a 3600 pair cable.

Thus, while the first quarter-bank as shown in FIG. 12 and denoted by the numeral 92 could be as many as 20, one would practically limit the number of wire organizers to 14 because it is easier to work with a smaller number of wire organizers and, further, enough binder groups have been removed from the core that the remaining quarter banks B1, C1, and D1 may be connected without increasing the outside diameter of the cable. More particularly, quarter bank D1 of cable 88 may contain half the number of total binder groups less the binder groups connected in quarter-bank A1 without increasing the outside diameter of the cable as previously discussed.

The next problem to be solved is how many binder groups should be connected in the second quarter bank, B1. As will be appreciated, there is considerably more space in which to connect these binder groups because up to 20 pairs of binder groups occupying the proportional space have already been connected in first quarter-bank A1 in addition to the space vacated by the removed sheath. As a practical matter, there is no particular problem in obtaining the required number of connected binder groups in the second quarter-bank. However, because quarter bank C1 will have even more space in which to connect the binder groups because more binder groups will have been connected in B1, one connects approximately one-third of the one-half binder groups which will be organized in total in the B1 and C1 quarter-banks. For a 3600 pair cable, for example, one connects 28 binder groups in quarter bank B1, and 44 binder groups in quarter-bank C1.

As shown in FIG. 12, a second connected cable having four axially spaced apart and serially connected quarter-banks is pulled to a common location.

As can be seen in FIG. 13 and as is standard in the industry, the cables 88 and 108 are folded back and corresponding quarter-banks are matched. It will be noted that quarter banks A1 and D1 of cable 88 are matched with quarter banks C2 and B2 of cable 108 and quarter-banks B1 and C1 of cable 88 are matched with quarter-banks D2 and A2 of cable 108 forming full banks 110 and 112 as shown in FIG. 14.

When the banks are folded back and matched with the corresponding banks of the other cable, they are connected by means of a separate external crimp contact means, described previously.

While the instant invention has been described by reference to what is believed to be the most practical embodiments, it is understood that the invention may embody other specific forms not departing from the spirit of the central characteristics of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the appended claims rather than the foregoing description and all equivalents thereto being intended to be embraced therein.

What is claimed is:

1. A method for organizing and preconnecting a cable, the organized, preconnected cable to be pulled through a standard duct having a predetermined inside diameter, the steps of organizing and preconnectorizing comprising:

providing a cable having an outside diameter less than the inside diameter of the duct, the cable covered with a sheath extending from the first end to the second end, the cable having a core of wires, the wires being divided into binder groups;

removing the sheath a predetermined distance from the first end of the cable;

organizing the binder groups into four axially spaced apart, serially connected quarter-banks as follows:
selecting the proper number of binder groups in the first quarter-bank connectorization, such that after connection of the binder groups in the first quarter-bank to wire organizers, the outside diameter of the first quarter-bank does not exceed the outside diameter of the cable;

connecting each binder group of the first quarter-bank to a wire organizer, wherein the outside diameter of the now connected first quarter-bank does not exceed the outside diameter of the cable;

similarly, selecting the proper number of binder groups to the remaining, second, third and fourth quarter-banks;

similarly, connecting the remaining, second, third and fourth quarter-banks to wire organizers, wherein no quarter-bank exceeds the outside diameter of the cable;

attaching a pulling means to the first end of the cable, the pulling means connected to the sheath and wires at the first end, such that the maximum overall outside diameter of the cable with pulling means attached, is less than the maximum inside diameter of the duct, providing a second cable such as the first cable, which has been similarly organized and preconnectorized;

removing the pulling means of each cable; folding back each cable at the second and third quarter-banks; matching corresponding quarter-banks such that all wire organizers are paired; and connecting each matched pair of wire organizers of each cable by a crimp contact element.

* * * * *